United States Patent [19]
Fukushima

[11] Patent Number: 5,579,420
[45] Date of Patent: Nov. 26, 1996

[54] OPTICAL FILTER

[75] Inventor: Nobuhiro Fukushima, Kawasaki, Japan

[73] Assignee: Fujitsu Limited, Kanagawa, Japan

[21] Appl. No.: 598,190

[22] Filed: Feb. 7, 1996

[30]   Foreign Application Priority Data

Aug. 23, 1995  [JP]  Japan .................................. 7-214732

[51] Int. Cl.$^6$ .................................................. G02B 6/00
[52] U.S. Cl. ............................................................ 385/11
[58] Field of Search ................................. 385/11, 33, 7, 385/9, 14, 16, 30, 40, 41, 34, 47; 356/150; 359/341; 372/703, 52, 32, 6, 18, 46, 94, 96

[56]            References Cited

U.S. PATENT DOCUMENTS

| | | | |
|---|---|---|---|
| 4,197,008 | 4/1980 | Pinnow et al. | 356/150 |
| 4,548,478 | 10/1985 | Shirasaki | 385/33 |
| 4,575,193 | 3/1986 | Greivenkamp, Jr. | 350/401 |
| 5,355,249 | 10/1994 | Souda | 385/34 |
| 5,402,509 | 3/1995 | Fukushima | 385/33 |
| 5,446,807 | 8/1995 | Baran et al. | 385/11 |
| 5,513,194 | 4/1996 | Tamura et al. | 372/6 |
| 5,537,432 | 7/1996 | Mehuys et al. | 372/50 |

FOREIGN PATENT DOCUMENTS

| | | |
|---|---|---|
| 60-103330 | 6/1985 | Japan . |
| 60-203914 | 10/1985 | Japan . |
| 4-159516 | 6/1992 | Japan . |

*Primary Examiner*—Akm E. Ullah
*Attorney, Agent, or Firm*—Staas & Halsey

[57]            ABSTRACT

An optical filter including first, second, and third birefringent elements arranged in this order on an optical path leading from an input port to an output port, and a device for changing a vector of birefringence in the second birefringent element. The first birefringent element splits an input beam into first and second beams having planes of polarization perpendicular to each other to output the first and second beams. The second birefringent element receives the first and second beams to output third and fourth beams converted in polarized condition from the first and second beams, respectively. The third birefringent element receives the third and fourth beams, splits the third beam into fifth and sixth beams having planes of polarization perpendicular to each other to output the fifth and sixth beams, and splits the fourth beam into seventh and eighth beams having planes of polarization perpendicular to each other to output the seventh and eighth beams.

19 Claims, 13 Drawing Sheets

FIG. I
(PRIOR ART)
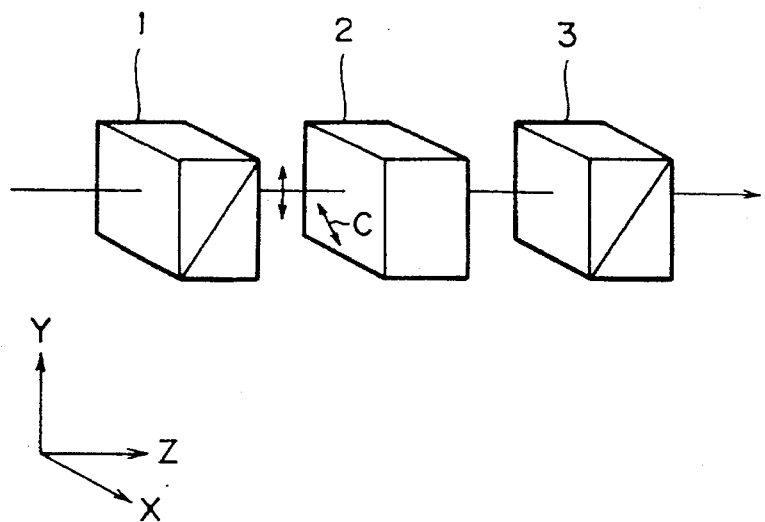
FIG. 2
(PRIOR ART)
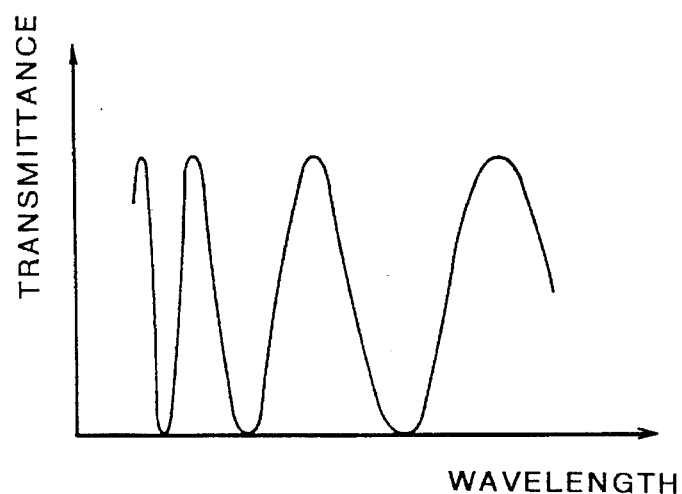

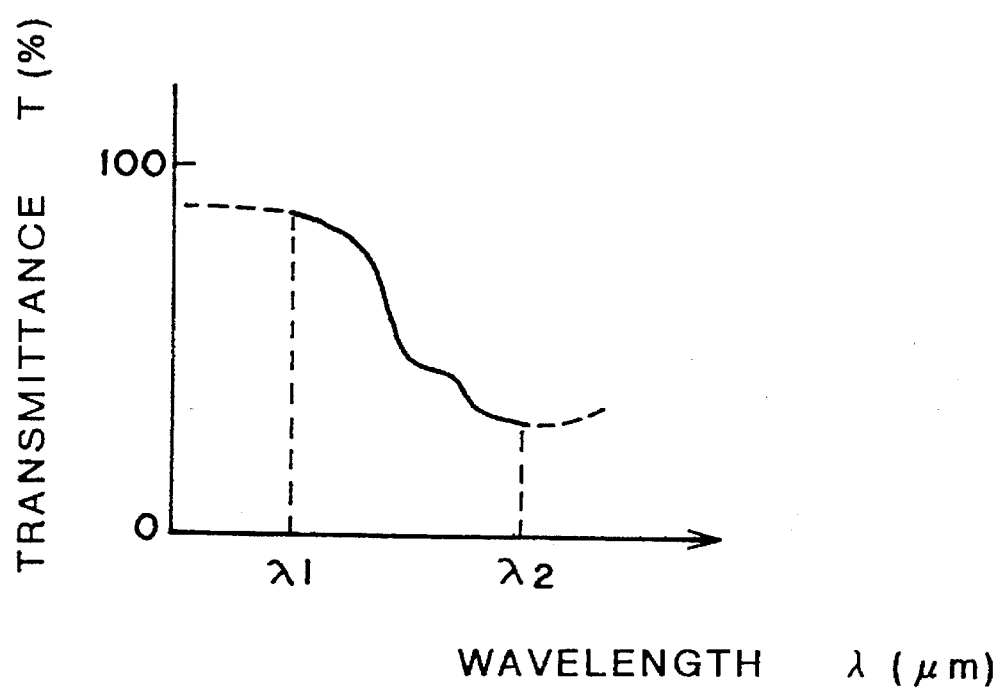

OPTICAL FILTER

BACKGROUND OF THE INVENTION

1. Field of the Invention

The present invention relates to an optical filter which can change a wavelength characteristic representing a relation between transmittance and wavelength.

2. Description of the Related Art

In recent years, an optical pumping type of optical amplifier including an erbium doped fiber amplifier (EDFA) for amplifying signal light having a wavelength of 1.55 μm band as a leading optical amplifier has become a level of practical application. In such an optical pumping type of optical amplifier, signal light and pumping light are introduced into a light amplifying medium doped with a rare earth element, and the signal light is amplified by the power of the pumping light.

In this kind of optical amplifier, an optical filter is used for various purposes. For example, a band-pass optical filter having a narrow passband is used to cut off light (spontaneous emission light and pumping light) other than signal light amplified in a light amplifying medium. Further, in applying the optical amplifier to a wavelength division multiplexing (WDM) system, a wide-band gain is required. Therefore, to make flat a gain characteristic of the optical amplifier representing a relation between gain and wavelength, an optical filter having a wavelength characteristic reverse to the gain characteristic. Since the gain characteristic of the optical amplifier and the wavelength of signal light are not always constant, an optical filter having a variable wavelength characteristic is desired.

Conventionally, an optical filter having a mechanical movable portion is known as the optical filter having a variable wavelength characteristic. In this kind of optical filter, the wavelength characteristic is varied, for example, by mechanically changing the angle of incidence of an input beam upon an optical interference film or a diffraction grating.

However, such an optical filter having a mechanical movable portion has a defect such that a high-speed operation is difficult and reliability is lacking. Further, in an optical amplifier to be applied to an optical repeater for long-distance transmission, the polarized condition of an input beam is not defined. Therefore, to make an output from the optical repeater constant, it is essential to use a polarization-nondependent optical filter such that transmittance is not dependent on the polarized condition of the input beam.

SUMMARY OF THE INVENTION

It is therefore an object of the present invention to provide a polarization-nondependent optical filter.

It is another object of the present invention to provide a polarization-nondependent optical filter which can change a wavelength characteristic.

It is a further object of the present invention to provide a polarization-nondependent optical filter which can change a wavelength characteristic without using a mechanical movable portion.

In accordance with a first aspect of the present invention, there is provided an optical filter comprising first, second, and third birefringent elements respectively having first, second, and third principal axes, and adjusting means for changing a vector of birefringence in the second birefringent element. The vector can be changed by adjusting of magnitude and/or direction of birefringent of the second birefringent element. The first birefringent element splits an input beam into a first beam (corresponding to an ordinary ray in this element) having a plane of polarization perpendicular to the first principal axis and a second beam (corresponding to an extraordinary ray in this element) having a plane of polarization parallel to the first principal axis. The second principal axis is inclined at an angle to the first principal axis. That is, the second principal axis is neither perpendicular nor parallel to the first principal axis. The second birefringent element receives the first beam and the second beam to output a third beam converted in polarized condition from the first beam and a fourth beam converted in polarized condition from the second beam.

The third birefringent element is provided substantially symmetrically with the first birefringent element with respect to the second birefringent element. The third birefringent element receives the third beam and splits it into a fifth beam (corresponding to an ordinary ray in this element) having a plane of polarization perpendicular to the third principal axis and a sixth beam (corresponding to an extraordinary ray in this element) having a plane of polarization parallel to the third principal axis to output the fifth beam and the sixth beam. The third birefringent element further receives the fourth beam and splits it into a seventh beam (corresponding to an ordinary ray in this element) having a plane of polarization perpendicular to the third principal axis and an eighth beam (corresponding to an extraordinary ray in this element) having a plane of polarization parallel to the third principal axis to output the seventh beam and the eighth beam.

The first, second, and third birefringent elements are arranged in this order on an optical path leading from an input port to an output port. The input port and the output port comprise excitation ends of an input optical fiber and an output optical fiber, respectively, for example. The optical path comprises a first optical path including the first, third, and fifth beams and a second optical path including the second, fourth, and eighth beams. The sixth and seventh beams are deviated from the first and second optical paths, respectively, to be removed.

In the optical filter according to the first aspect of the present invention, the power ratio between the fifth and sixth beams and the power ratio between the seventh and eighth beams are dependent on the magnitude of birefringence in the second birefringent element and the wavelength of the input beam. Accordingly, the wavelength characteristic can be changed. Further, for an input beam having a fixed wavelength, the total power of the fifth and eighth beams is constant irrespective of the polarized condition of the input beam. Accordingly, it is possible to provide a polarization-nondependent optical filter.

In accordance with a second aspect of the present invention, there is provided an optical filter comprising a plurality of filter units cascade-connected together, wherein each filter unit has the configuration according to the first aspect of the present invention. According to the second aspect of the present invention, a wavelength characteristic is obtained by synthesizing the wavelength characteristics of all the filter units. Accordingly, an arbitrary wavelength characteristic of the optical filter can be easily set according to the gain characteristic or the like of an optical amplifier.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is an illustration showing a birefringent filter in the prior art;

FIG. 2 is a graph showing an operation characteristic (wavelength characteristic) of the birefringent filter shown in FIG. 1;

FIG. 9 is a graph showing an exemplary wavelength characteristic required in an optical amplifier;

DETAILED DESCRIPTION OF THE PREFERRED EMBODIMENTS

Figure 3:
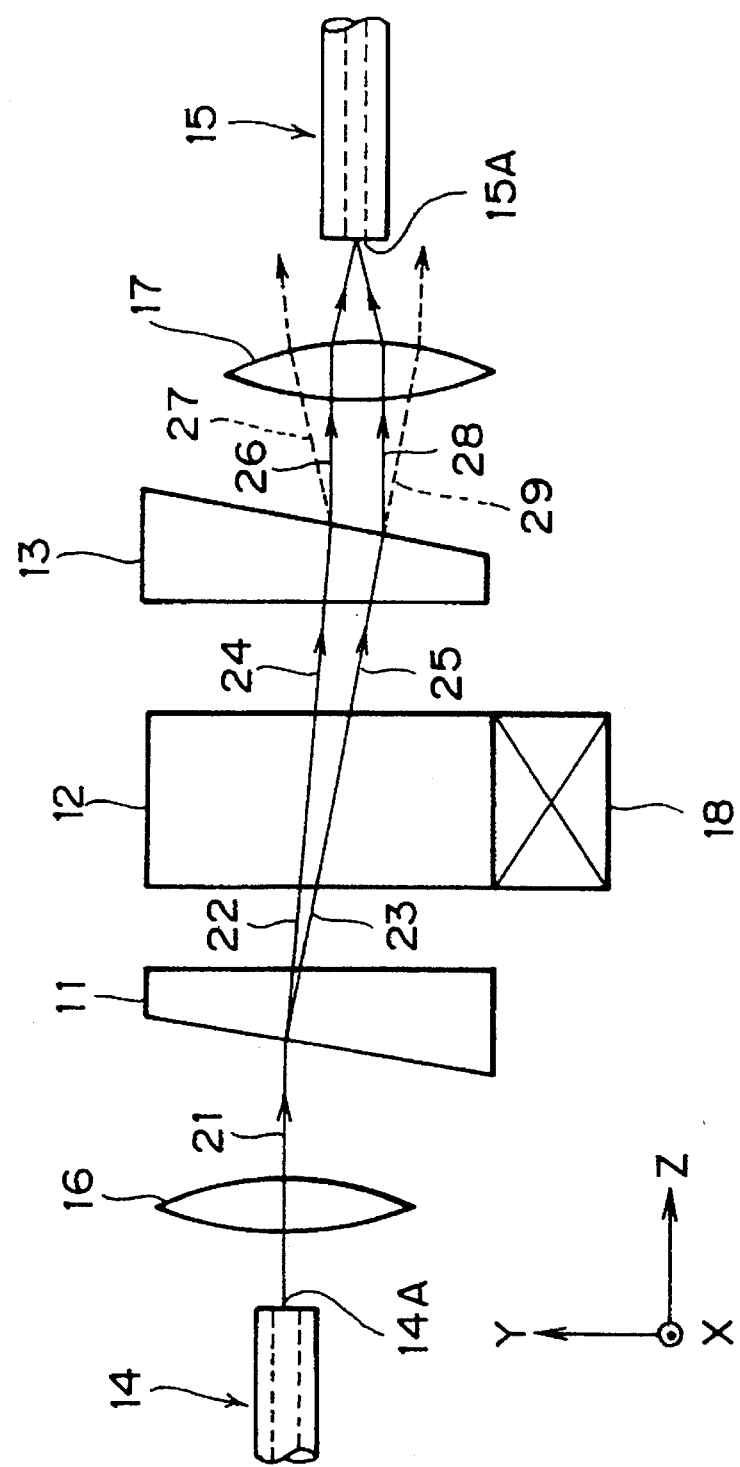
FIG. 3 is an illustration showing the configuration of an optical filter according to a first preferred embodiment of the present invention.

Some preferred embodiments of the present invention will now be described in detail with reference to the attached drawings.

First, a birefringent filter will be described with reference to FIG. 1 because it is considered useful in understanding the operation of the optical filter according to the present invention. The birefringent filter comprises a first polarizer 1, a birefringent element 2, and a second polarizer 3 arranged in this order on the optical path of transmitted light. The following description employs an XYZ coordinate system having a Z axis parallel to the optical path of transmitted light, a Y axis parallel to the transmission axis of the polarizer 1 (the direction of vibration of a linearly polarized wave transmitted), and an X axis orthogonal to the Y axis and the Z axis. The opposite end surfaces and the principal axis (optic axis) C of the birefringent element 2 are parallel to the XY plane, and the angle formed by the principal axis C and the Y axis is 45°. The transmission axis of the polarizer 3 is parallel to the transmission axis of the polarizer 1, for example.

When a linearly polarized wave transmitted through the polarizer 1 and having a plane of polarization parallel to the YZ plane is incident on the birefringent element 2, the linearly polarized wave is split into an ordinary component having a plane of polarization perpendicular to the principal axis C and an extraordinary component having a plane of polarization parallel to the principal axis C, and these components propagate in the birefringent element 2. When the ordinary component and the extraordinary component emerge from the birefringent element 2, these components are synthesized with a phase difference according to wavelength. The result of this synthesis may be a linearly polarized wave having a plane of polarization parallel to the YZ plane, may be a linearly polarized wave having a plane of polarization parallel to the XZ plane, or may be a circularly polarized wave or an elliptically polarized wave, depending on wavelength.

In the case that the transmission axis of the polarizer 3 is parallel to the Y axis, the transmittance of the polarizer 3 for the linearly polarized wave having a plane of polarization parallel to the YZ plane is 100% in principle; the transmittance of the polarizer 3 for the linearly polarized wave having a plane of polarization parallel to the XZ plane is 0% in principle; the transmittance of the polarizer 3 for the circularly polarized wave is 50% in principle; and the transmittance of the polarizer 3 for the elliptically polarized wave is dependent on the ellipticity of polarization of this wave. Accordingly, the transmittance of this birefringent filter is dependent on wavelength.

FIG. 2 is a graph showing an exemplary wavelength characteristic of the birefringent filter shown in FIG. 1, in which the vertical axis represents transmittance and the horizontal axis represents wavelength. This wavelength characteristic shows that a maximal value and a minimal value of transmittance alternately appear as wavelength increases. The maximal value of transmittance appears when a phase difference between the ordinary component and the extraordinary component is $2n\pi$, and the minimal value of transmittance appears when the phase difference is $(2n+1)\pi$, where n is an integer. In the wavelength characteristic shown in FIG. 2, the transmittance does not periodically change with a change in wavelength. However, in the case that the thickness of the birefringent element 2 shown in FIG. 1 is enough larger than a wavelength or a wavelength converted value of the phase difference, the transmittance changes substantially periodically with a change in wavelength.

If the birefringent filter shown in FIG. 1 additionally has means for changing the magnitude of birefringence in the birefringent element 2, the wavelength characteristic shown in FIG. 2 can be displaced in the direction of the wavelength axis, thereby obtaining a desired wavelength characteristic (e.g., a center wavelength in the passband of a band-pass optical filter) according to the magnitude of birefringence in the birefringent element 2. However, in the case that an input beam to the polarizer 1 has an arbitrary polarized condition, only a linearly polarized wave component having a plane of polarization parallel to the YZ plane is allowed to pass through the polarizer 1. Accordingly, the output power from the birefringent filter shown in FIG. 1 depends on the polarized condition of the input beam, causing inconvenience in practical use. Such inconvenience can be eliminated by the polarization nondependence in the optical filter of the present invention.

Figure 4:
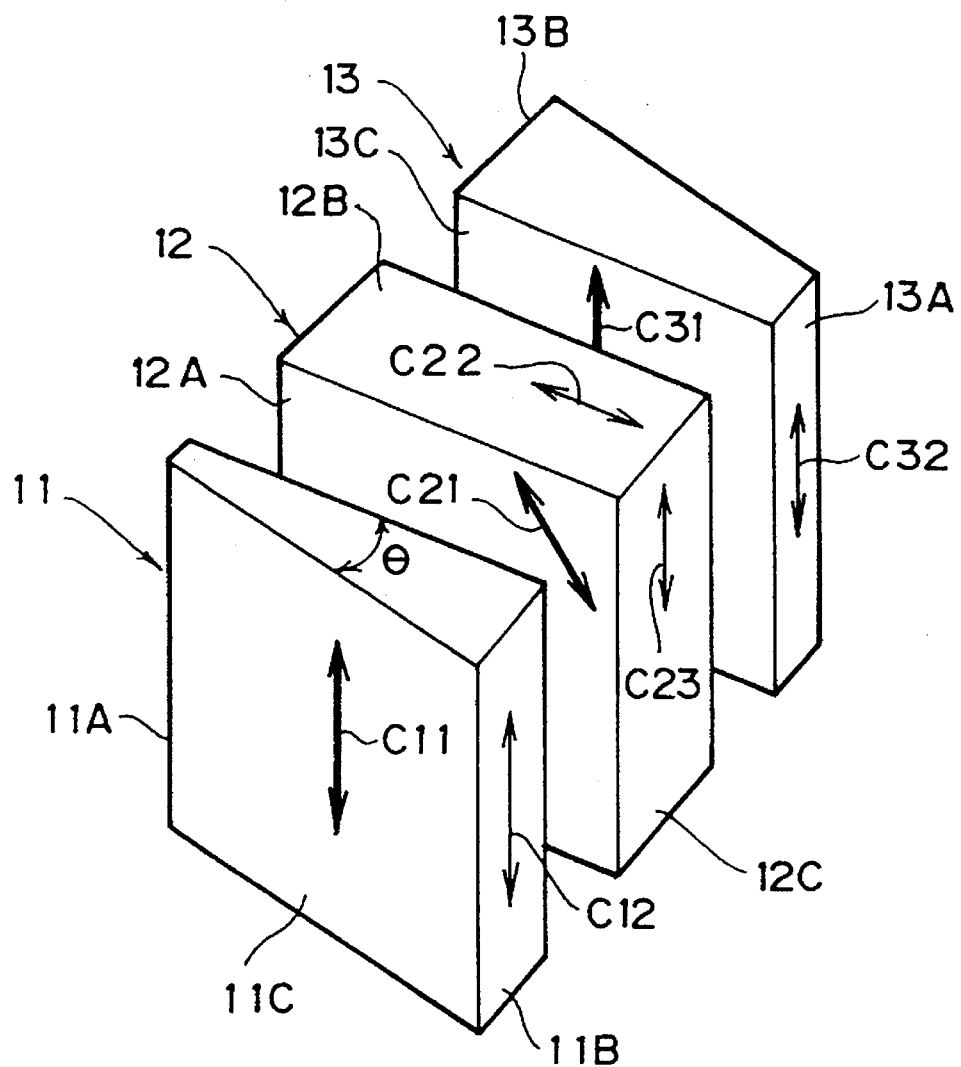
FIG. 4 is a perspective view of an essential part of the optical filter in the first preferred embodiment.

FIG. 3 is an illustration showing the configuration of an optical filter according to a first preferred embodiment of the present invention, and FIG. 4 is a perspective view of an essential part in the first preferred embodiment. This optical filter is provided with a wedge plate 11 as a first birefringent element, a plane plate 12 as a second birefringent element, and a wedge plate 13 as a third birefringent element, all of which are formed of a birefringent crystal such as rutile, calcite, or lithium niobate.

The wedge plate 11 has a top portion 11A small in thickness and a bottom portion 11B large in thickness. Reference numeral 11C denotes an incidence surface of the wedge plate 11. The term of "incidence surface" used herein means a surface through which light incident on an object body is passed. Reference numerals C11 and C12 denote projections of the principal axis of the wedge plate 11 onto the incidence surface 11C and the bottom portion (bottom surface) 11B, respectively. This preferred embodiment employs an XYZ coordinate system having a Z axis parallel to an input beam, an X axis parallel to the optic axis of the wedge plate 11, and a Y axis orthogonal to the Z axis and the X axis. The wedge angle θ of the wedge plate 11 is defined on a plane parallel to the YZ plane.

The wedge plate 11, the plane plate 12, and the wedge plate 13 are arranged in this order on the Z axis. Reference numeral C21 denotes a projection of the principal axis of the plane plate 12 onto an incidence surface 12A, and reference numerals C22 and C23 denote projections of the principal axis of the plane plate 12 onto side surfaces 12B and 12C, respectively. The principal axis of the plane plate 12 is inclined at an angle to the X axis. In this preferred embodiment, the angle of inclination is 45°. However, even when the angle of inclination of the principal axis of the plane plate 12 to the X axis is any angle other than 45°, the present invention can be embodied, and is limited only by the configuration that the principal axis of the plane plate 12 is neither parallel nor perpendicular to the X axis. The wedge plate 13 is arranged substantially symmetrically with the wedge plate 11 with respect to the plane plate 12. That is, a top portion 13A and a bottom portion 13B of the wedge plate 13 are opposite to the bottom portion 11B and the top portion 11A of the wedge plate 11, respectively, with respect to the plane plate 12.

Reference numeral C31 denotes a projection of the principal axis of the wedge plate 13 onto an incidence surface 13C, and reference numeral C32 denotes a projection of the principal axis of the wedge plate 13 onto the top portion (top surface) 13A. In this preferred embodiment, the principal axis of the wedge plate 13 is parallel to the X axis. The material and the wedge angle of the wedge plate 13 are the same as those of the wedge plate 11.

As shown in FIG. 3, the optical fiber has an input port provided as an excitation end 14A of an input optical fiber 14, and has an output port provided as an excitation end 15A of an output optical fiber 15. There are formed two optical paths between the excitation ends 14A and 15A. These optical paths will be understood in accordance with the principle of operation to be hereinafter described. In order to make each optical path into a collimating system, a lens 16 is provided so as to be opposed to the excitation end 14A of the input optical fiber 14, and a lens 17 is provided so as to be opposed to the excitation end 15A of the output optical fiber 15. Further, in order to change the magnitude of birefringence in the plane plate 12, a heater (or cooler) 18 for changing the temperature of the plane plate 12 is provided.

Light emitted from the excitation end 14A of the input optical fiber 14 is collimated by the lens 16 to become a parallel light beam. This beam is denoted by reference numeral 21, in which the beam thickness is ignored. The beam 21 is split by the wedge plate 11 into a beam 22 corresponding to an ordinary ray in the wedge plate 11 and a beam 23 corresponding to an extraordinary ray in the wedge plate 11. The beams 22 and 23 are output from the wedge plate 11 in different directions because the wedge plate 11 has a wedge angle. The beams 22 and 23 are next transmitted through the plane plate 12 to become beams 24 and 25, respectively. The polarized conditions of the beams 24 and 25 are determined by a vector of birefringence in the plane plate 12, and the vector is determined by magnitude and direction of birefringence in the plane plate 12. The magnitude of birefringence in the plane plate 12 is dependent on the temperature of the plane plate 12 to be changed by the heater (or cooler) 18. The beam 24 is split by the wedge plate 13 into beams 26 and 27 respectively corresponding to an ordinary ray and an extraordinary ray in the wedge plate 13. Further, the beam 25 is split by the wedge plate 13 into beams 28 and 29 respectively corresponding to an extraordinary ray and an ordinary ray in the wedge plate 13.

In considering the hysteresis of refraction which the beams 26 to 29 have undergone and the parallel arrangement of the corresponding surfaces of the wedge plates 11 and 13, it is understood that the beams 26 and 28 are parallel to each other and that the beams 27 and 29 are not parallel to each other. Accordingly, only the beams 26 and 28 of the beams 26 to 29 can be converged by the lens 17 to be coupled to the excitation end 15A of the output optical fiber 15. One of the two optical paths mentioned above includes the beams 22, 24, and 26, whereas the other optical path includes the beams 23, 25, and 28. The remaining beams 27 and 29 deviate from these optical paths, thereby being removed.

The ratio of the total power of the beams 26 and 28 coupled to the output optical fiber 15 to the power of the input beam corresponds to the transmittance of the optical filter, and this transmittance is dependent on the magnitude of birefringence in the plane plate 12. That is, a wavelength characteristic similar to that shown in FIG. 2 is obtained. Accordingly, the wavelength characteristic can be displaced in the direction of the wavelength axis by changing the temperature of the plane plate 12 by means of the heater (or cooler) 18 and thereby changing the magnitude of birefringence in the plane plate 12, thus obtaining a desired wavelength characteristic. Further, in the condition where the magnitude of birefringence in the plane plate 12 is constant, the total power of the beams 26 and 28 is not dependent on the polarized condition of the input beam.

Thus, according to the present embodiment, it is possible to provide a polarization-nondependent optical filter which can obtain a desired wavelength characteristic. Further, since no mechanical movable portions are required to change the magnitude of birefringence in the plane plate 12, it is possible to provide an optical filter which is highly reliable. The reason why the collimating system is employed in this preferred embodiment is that the coupling efficiency to the output optical fiber 15 is sensitive to the directions of the beams.

Figure 5:
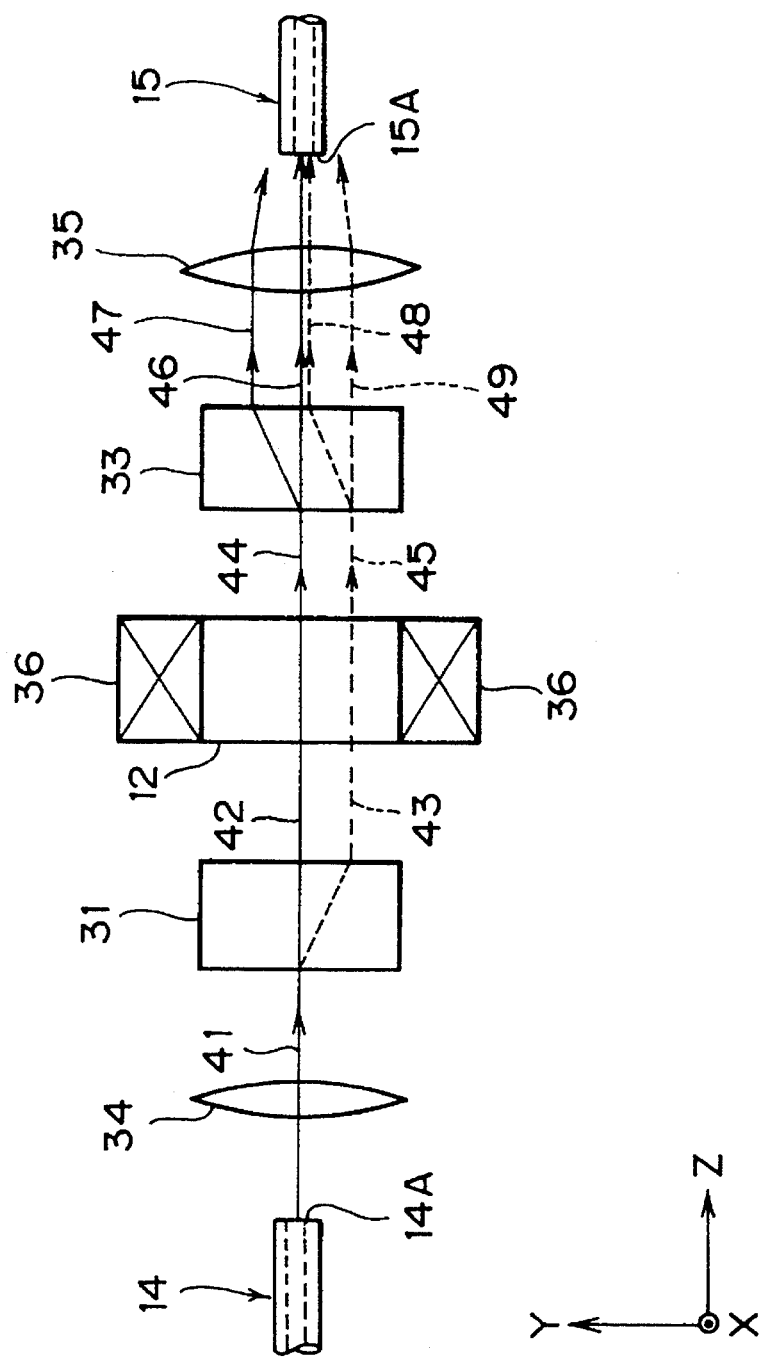
FIG. 5 is an illustration showing the configuration of an optical filter according to a second preferred embodiment of the present invention.
Figure 6:
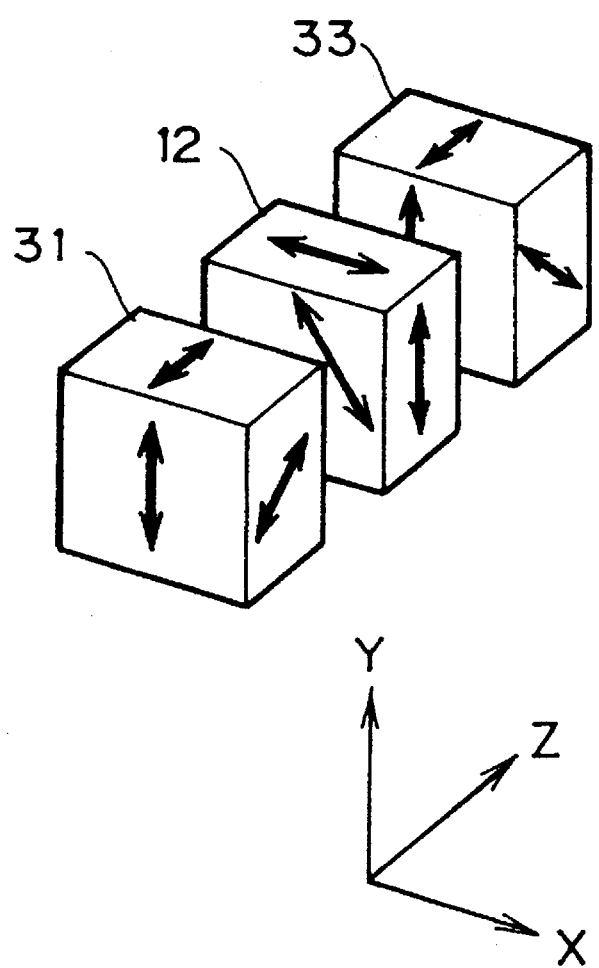
FIG. 6 is a perspective view of an essential part of the optical filter in the second preferred embodiment.

FIG. 5 is an illustration showing the configuration of an optical filter according to a second preferred embodiment of the present invention, and FIG. 6 is a perspective view of an essential part in the second preferred embodiment. As shown in FIG. 6, the optical filter includes a plane plate 31 as a first birefringent element, a plane plate 12 as a second birefringent element, and a plane plate 33 as a third birefringent element, all of which are formed of a birefringent crystal. In an XYZ coordinate system defined in FIGS. 5 and 6, the Z axis is parallel to the direction of an incident beam. Arrows shown on the surfaces of the plane plates 31, 12, and 33 shown in FIG. 6 represent projections of the principal axes of the plane plates 31, 12, and 33 onto the corresponding surfaces. The incidence surfaces of the plane plates 31, 12, and 33 are parallel to the XY plane. The principal axis of the plane plate 31 is inclined at an angle of about 45° to the Z axis. The principal axis of the plane plate 12 is inclined at an angle of about 45° to the Y axis. The principal axis of the plane plate 33 is substantially symmetrical with the principal axis of the plane plate 31 with respect to the plane plate 12.

As shown in FIG. 5, two optical paths to be hereinafter described are set between an excitation end 14A of an input optical fiber 14 as an input port and an excitation end 15A of an output optical fiber 15 as an output port. In order to make each optical path into a converging system, a lens 34 is provided so as to be opposed to the excitation end 14A of the input optical fiber 14, and a lens 35 is provided so as to be opposed to the excitation end 15A of the output optical fiber 15. The reason why the converging system is employed in this preferred embodiment is that the coupling efficiency to the output optical fiber 15 is sensitive to the positions of the beams. Each of the two optical paths formed between the excitation ends 14A and 15A lies on a focal point between the lenses 34 and 35. Accordingly, the shape of the beam on each optical path is conical; however, it should be understood that the beam on each optical path shown in FIG. 5 is represented by the center line of the beam which is conical in actual.

Light emitted from the excitation end 14A of the input optical fiber 14 is made into a beam 41 by the lens 34. The beam 41 is split by the plane plate 31 into beams 42 and 43 respectively corresponding to an ordinary ray and an extraordinary ray in the plane plate 31. The beams 42 and 43 are parallel to each other, and they are output from the plane plate 31 at different positions. The beams 42 and 43 are next transmitted through the plane plate 12 to become beams 44 and 45, respectively. In this preferred embodiment, the magnitude of birefringence in the plane plate 12 is changed by a stress applying device 36. The stress applying device 36 functions to apply a stress in one direction, for example, to the plane plate 12, thereby producing stress birefringence in the plane plate 12 to change the magnitude of birefringence in the plane plate 12.

The beam 44 is next split by the plane plate 33 into beams 46 and 47 respectively corresponding to an ordinary ray and an extraordinary ray in the plane plate 33. On the other hand, the beam 45 is next split by the plane plate 33 into beams 48 and 49 respectively corresponding to an extraordinary ray and an ordinary ray in the plane plate 33. The plane plates 31 and 33 are parallel to each other and have the same thickness. Therefore, the beams 46 and 48 are superimposed on each other. Accordingly, only the beams 46 and 48 of the beams 46 to 49 can be converged by the lens 35 to be coupled to the excitation end 15A of the output optical fiber 15. One of the two optical paths mentioned above includes the beams 42, 44, and 46, and the other optical path includes the beams 43, 45, and 48. The remaining beams 47 and 49 deviate from these optical paths, thereby being removed.

The ratio of the total power of the beams 46 and 48 to the power of the input beam is dependent on the magnitude of birefringence in the plane plate 12 and the wavelength of the input beam. This power ratio corresponds to the transmittance of the optical filter. Accordingly, a wavelength characteristic similar to that shown in FIG. 2 is obtained also in this preferred embodiment. Further, the wavelength characteristic can be displaced in the direction of the wavelength axis by changing the magnitude of birefringence in the plane plate 12 by means of the stress applying device 36 to thereby obtain a desired wavelength characteristic. In the condition where the magnitude of birefringence in the plane plate 12 is constant, the total power of the beams 46 and 48 is not dependent on the polarized condition of the input beam. Thus, according to this preferred embodiment, it is possible to provide a polarization-nondependent optical filter which can obtain a desired wavelength characteristic.

FIGS. 7A to 7D are illustrations showing various modifications of the adjusting means for changing the magnitude of birefringence in the second birefringent element (plane plate 12). In each figure, reference character OP denotes an optical path leading from the input port to the output port.

Figure 7A:
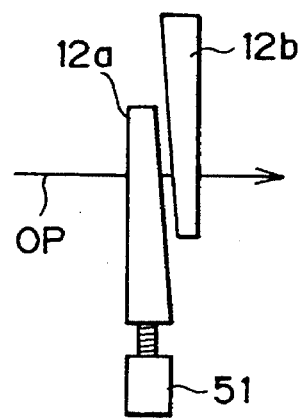
FIGS. 7A to 7D are illustrations showing various modifications of adjusting means.

In the modification shown in FIG. 7A, the second birefringent element is divided into a first birefringent wedge plate 12a having a top portion small in thickness and a bottom portion large in thickness and a second birefringent wedge plate 12b having the same shape as that of the first birefringent wedge plate 12a. The top portion and the bottom portion of the second birefringent wedge plate 12b are located on the same sides as the bottom portion and the top portion of the first birefringent wedge plate 12a, respectively, with respect to the optical path OP. A piezoelectric drive device 51 is connected to the bottom portion of the wedge plate 12a, for example, so as to displace at least one of the wedge plates 12a and 12b in a direction substantially perpendicular to the optical path OP. With this arrangement, the thickness of a portion of the second birefringent element where the optical path OP is passed can be changed by displacing the wedge plate 12a by means of the piezoelectric drive device 51, thereby changing the magnitude of birefringence in the second birefringent element.

Figure 7B:
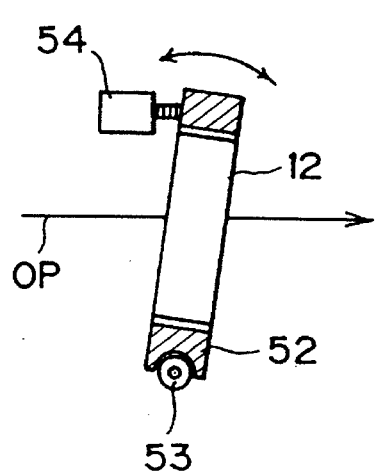

In the modification shown in FIG. 7B, the plane plate 12 is supported pivotably about a shaft substantially perpendicular to the optical path OP, and the adjusting means includes means for changing a rotational angle of the plane plate 12 about this shaft. More specifically, the plane plate 12 is supported to a frame 52, and one end of the frame 52 is pivotably mounted on a shaft member 53 perpendicular to the optical path OP. The other end of the frame 52 is displaced by a piezoelectric drive device 54 to thereby change the rotational angle of the plane plate 12. Accordingly, the length of a portion of the optical path OP passing through the plane plate 12 can be changed to thereby change the magnitude of birefringence in the plane plate 12.

Figure 7C:
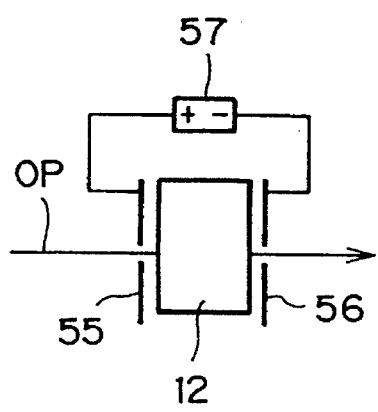

In the modification shown in FIG. 7C, the adjusting means includes means for applying a voltage to the plane plate 12 and means for changing the applied voltage. More specifically, electrodes 55 and 56 each having a hole allowing the pass of the optical path OP are provided so as to sandwich the plane plate 12, in order to apply a voltage to the plane plate 12 in the leading direction of the optical path OP. The electrodes 55 and 56 are connected to a plus terminal and a minus terminal of a variable voltage source 57, respectively. In this case, an electro-optic crystal such as KDP is suitable for the material of the plane plate 12 to efficiently change the magnitude of birefringence in the plane plate 12 by the applied voltage.

Figure 7D:
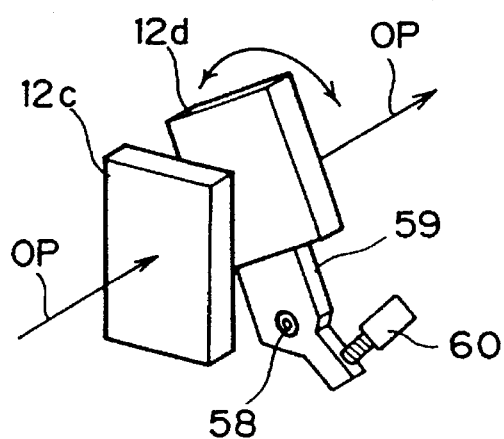

In the modification shown in FIG. 7D, the plane plate 12 is divided into a first birefringent plane plate 12c fixed in position with respect to the optical path OP and a second birefringent plane plate 12d supported pivotably about a shaft substantially parallel to the optical path OP. The adjusting means includes means for changing a rotational angle of the second birefringent plane plate 12d about this shaft. More specifically, a support member 59 is supported pivotably about a shaft member 58 substantially parallel to the optical path OP. The second birefringent plane plate 12d is fixed to one end of the support member 59. A piezoelectric drive device 60 is connected to the other end of the support member 59. Accordingly, the rotational angle of the second birefringent plane plate 12d can be changed by the piezoelectric drive device 60.

Figure 8:
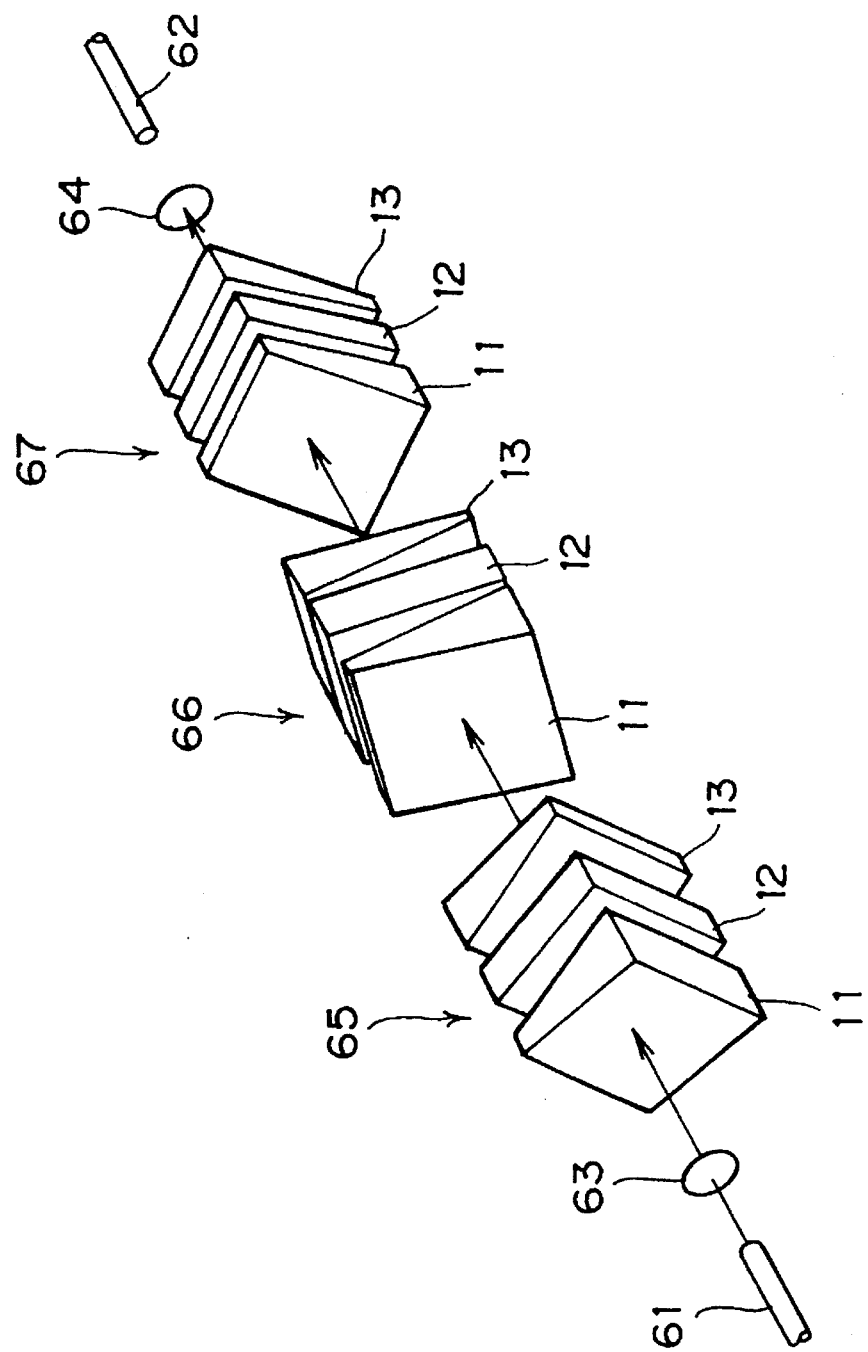
FIG. 8 is a perspective view of an essential part of an optical filter according to a third preferred embodiment of the present invention.

FIG. 8 is a perspective view of an optical filter showing a third preferred embodiment of the present invention. This optical filter is provided with an input optical fiber 61, an output optical fiber 62, a lens 63 provided so as to be opposed to the excitation end of the fiber 61, a lens 64 provided so as to be opposed to the excitation end of the fiber 62, and a plurality of (three in this preferred embodiment) filter units 65, 66, and 67 arranged between the lens 63 and 64. Each of the filter units 65, 66, and 67 has the configuration of the optical filter according to the first aspect of the present invention. In this preferred embodiment, the wedge plate 11, the plane plate 12, the wedge plate 13, and the heater (or cooler) 18 of the optical filter shown in FIG. 3 are applied to each filter unit; however, the heater (or cooler) 18 is not shown in FIG. 8. Further, in association with the application of the configuration shown in FIG. 3, the lenses 63 and 64 are so set as to form optical paths of a collimating system between the fibers 61 and 62. The filter units 65, 66, and 67 are cascade-connected together. This cascade-connection will now be described more specifically.

Light emitted from the input optical fiber 61 corresponds to the beam 21 (see FIG. 3) in the filter unit 65. Each of the beams 26 and 28 (see FIG. 3) output from the filter unit 65 becomes the beam 21 in the filter unit 66. Accordingly, each of the beams 26 and 28 output from the filter unit 66 consists of two beams. Thus, each of the totally four parallel beams from the filter unit 66 become the beam 21 in the filter unit 67. Each of the beams 26 and 28 output from the filter unit 67 consists of four beams. That is, totally eight parallel beams are output from the filter unit 67 in principle, and these beams are converged by the lens 64 to be supplied to the output optical fiber 62.

In this preferred embodiment, the wedge direction (the direction of expansion of a plane on which the wedge angle is defined) of the filter unit 66 is inclined at an angle of 45° to the wedge direction of the filter unit 65, and the wedge direction of the filter unit 67 is perpendicular to the wedge direction of the filter unit 65. Thus, the wedge directions of all the filter units (the wedge directions of the birefringent wedge plates on the input side) are made different from each other to thereby prevent that the undesired beams once deviated from the optical paths (see the beams 27 and 29 shown in FIG. 3) may be returned to the subsequent filter unit, thus obtaining a desired wavelength characteristic of the optical filter. For example, in the case that the wedge directions of adjacent filter units are made different by an angle of 5°, totally 35 filter units can be used. Further, a plurality of filter units are cascade-connected together to thereby obtain a desired arbitrary wavelength characteristic.

FIG. 9 shows an exemplary wavelength characteristic required in an optical amplifier, for example. In FIG. 9, the vertical axis represents transmittance T (%), and the horizontal axis represents wavelength $\lambda$ (μm). For example, there is a case that a wavelength characteristic such that the transmittance changes continuously in the wavelength range between $\lambda_1$ and $\lambda_2$ as shown is required. It is very difficult to obtain such a specific wavelength characteristic in the prior art.

Referring to FIGS. 10A to 10D, there is shown a method of obtaining an arbitrary wavelength characteristic in the preferred embodiment shown in FIG. 8. In the case shown in FIG. 9 where the transmittance changes continuously in a limited wavelength range, such a wavelength characteristic can be approximated by the combination of a finite number of sine waves. Since the wavelength characteristic to be required in an optical amplifier is relatively simple, it is sufficient to combine two to four sine waves.

Figure 10C:
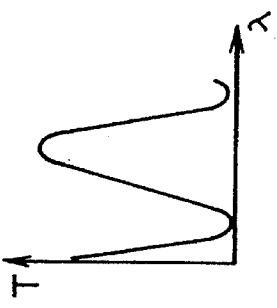
FIGS. 10A to 10D are graphs showing a method of obtaining an arbitrary wavelength characteristic.
Figure 10B:
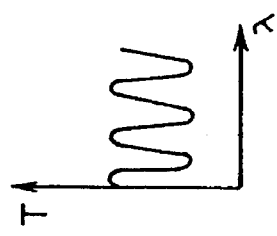
Figure 10D:
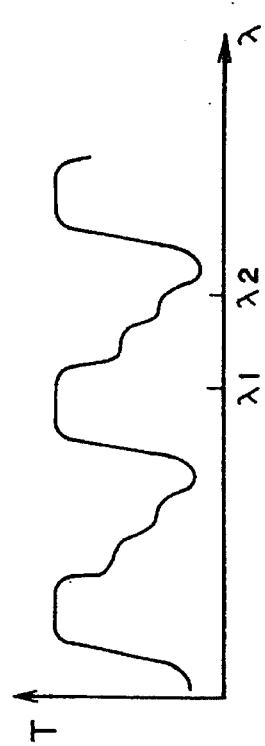
Figure 10A:
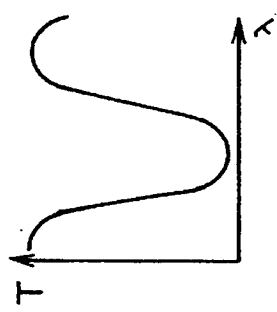

FIGS. 10A, 10B, and 10C show the wavelength characteristics of the filter units 65, 66, and 67 shown in FIG. 8, respectively, each of the wavelength characteristics having a sinusoidal shape. The period and the phase of the sine wave in each wavelength characteristic is dependent on the magnitude of birefringence in the plane plate 12 (the second birefringent element) of each filter unit. Further, the amplitude of the sine wave in each wavelength characteristic is dependent on the angle formed between the principal axes of the first and second birefringent elements or the angle formed between the principal axes of the second and third birefringent elements. Accordingly, the wavelength characteristic of each filter unit can be decided by suitably setting these parameters, and a desired wavelength characteristic of the optical filter can be obtained by synthesizing the wavelength characteristics thus decided.

FIG. 10D shows a wavelength characteristic obtained by synthesizing the wavelength characteristics shown in FIGS. 10A, 10B, and 10C. As apparent from FIG. 10D, the required wavelength characteristic shown in FIG. 9 is repeatedly obtained along the direction of the wavelength axis. Accordingly, the gain characteristic of the optical amplifier can be made flat by using this optical filter in the required wavelength band ($\lambda_1$ to $\lambda_2$). In general, there occurs ripple in the wavelength characteristic of an optical filter using a dielectric multilayer film, causing inconvenience in practical use. To the contrary, no ripple occurs in operation principle according to this preferred embodiment. Further, it is possible to provide an optical filter which can greatly reduce an insert loss at a wavelength where the maximum transmittance is obtained.

Figure 11:
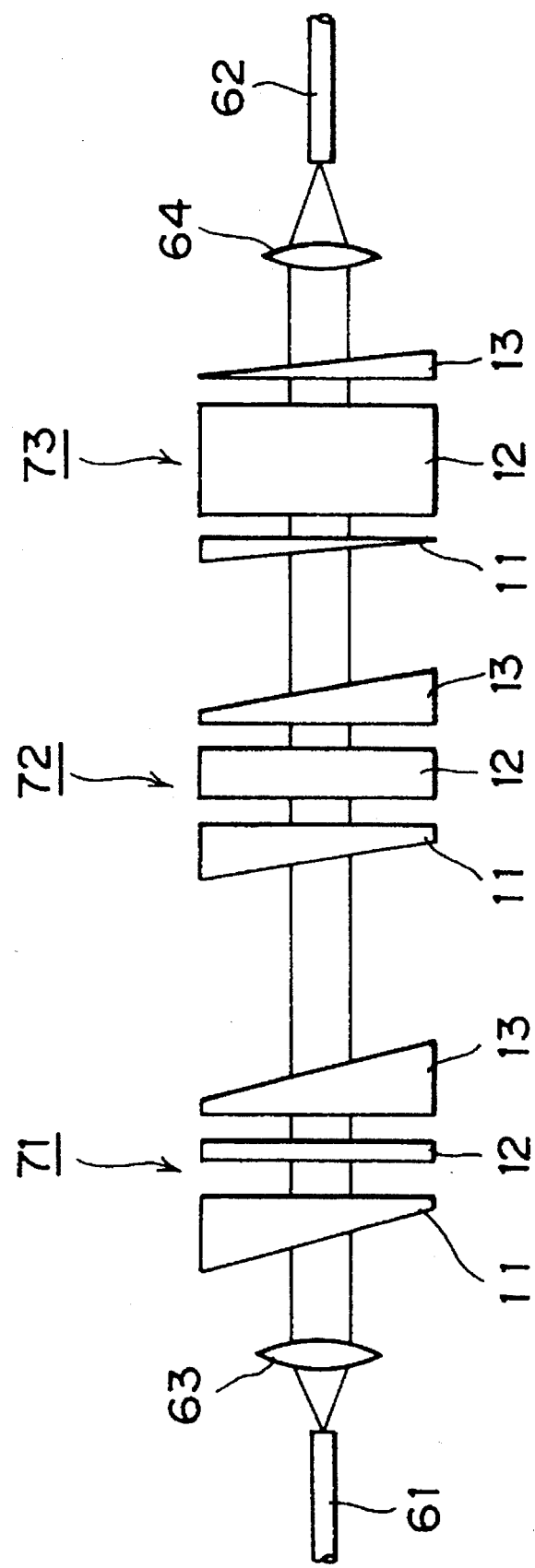
FIG. 11 is an illustration showing the configuration of an essential part of an optical filter according to a fourth preferred embodiment of the present invention.

FIG. 11 illustrates the configuration of an optical filter according to a fourth preferred embodiment of the present invention. This optical filter has a plurality of (three in this preferred embodiment) filter units 71, 72, and 73 having two features in place of the filter units 65, 66, and 67 in the third preferred embodiment shown in FIG. 8. Each of the filter units 71, 72, and 73 has a configuration similar to that of the optical filter shown in FIG. 3, and the adjusting means is not shown in FIG. 11.

The first feature is that the wedge angles of the filter units 71, 72, and 73 are different from each other. In this preferred embodiment, the wedge angle of the filter unit 72 is smaller than that of the filter unit 71, and the wedge angle of the filter unit 73 is smaller than that of the filter unit 72. Thus, the wedge angles of all the filter units are made different to thereby prevent that the undesired beams once deviated from the optical paths may be returned to the optical paths, rather than by making different the wedge directions of all the filter units as shown in FIG. 8.

The second feature is that the thicknesses of the plane plates 12 (the second birefringent elements) in the filter units 71, 72, and 73 are different from each other, and that the sequence of the different thicknesses from the smallest one forms a geometric progression with a ratio of 2. In this preferred embodiment, let t denote the thickness of the plane plate 12 in the filter unit 71, the thicknesses of the plane plates 12 in the filter units 72 and 73 are represented by $2t$ and $4t$, respectively. Although the filter units 71, 72, and 73 are arranged in the increasing order of the thicknesses of the plane plates 12 in this preferred embodiment, this order of arrangement is arbitrary.

Figure 12:
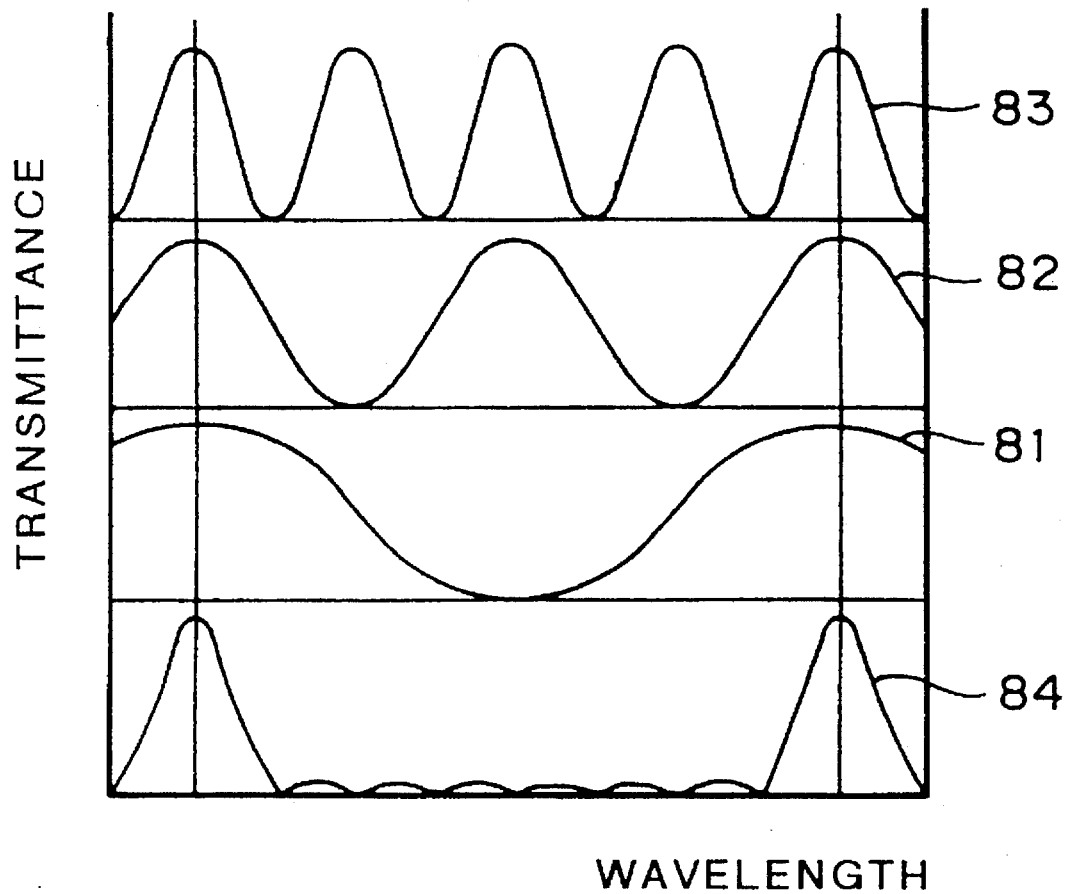
FIG. 12 is a graph illustrating a wavelength characteristic of the optical filter shown in FIG. 11.

FIG. 12 is a graph showing the wavelength characteristic of the optical filter shown in FIG. 11. Reference numeral 81 denotes the wavelength characteristic of the filter unit 71 having the thinnest plane plate 12; reference numeral 82 denotes the wavelength characteristic of the filter unit 72 having the second thinnest plane plate 12; and reference numeral 83 denotes the wavelength characteristic of the filter unit 73 having the thickest plane plate 12. Reference numeral 84 in FIG. 12 denotes the wavelength characteristic of the optical filter as a whole shown in FIG. 11. It should be understood that the wavelength characteristic 84 is obtained by synthesizing the wavelength characteristics 81, 82, and 83. Thus, the sequence of the thicknesses of the plane plates in all the filter units cascade-connected together forms a geometric progression, whereby the wavelength characteristic of the filter unit having the thinnest plane plate can be selected, and its channel spectral peak can be made greatly sharp.

Figure 13:
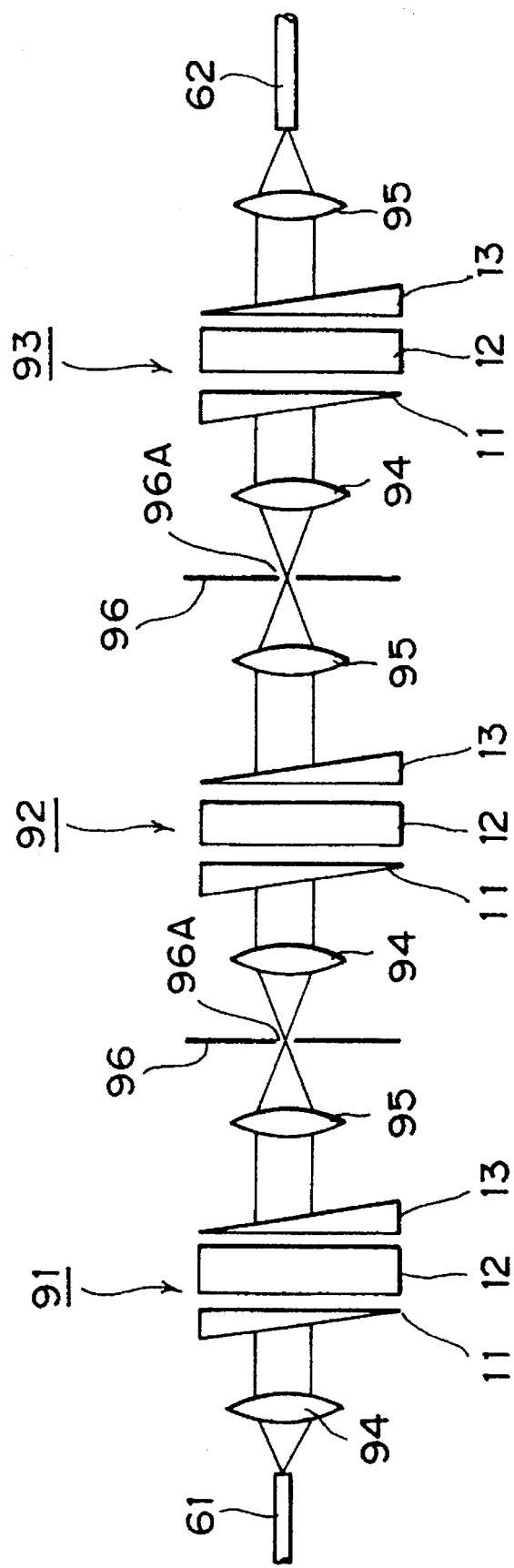
FIG. 13 is an illustration showing the configuration of an essential part of an optical filter according to a fifth preferred embodiment of the present invention.

FIG. 13 illustrates the configuration of an optical filter according to a fifth preferred embodiment of the present invention. A plurality of (three in this preferred embodiment) filter units 91, 92, and 93 each having a configuration similar to that shown in FIG. 3 are arranged between an input optical fiber 61 and an output optical fiber 62. To make each of the filter units 91, 92, and 93 into an independent collimating system, lenses 94 and 95 are located on the input side and the output side of each filter unit, respectively. Further, to prevent that the undesired beams once deviated from the optical paths may be returned to the optical paths, a shielding plate 96 having a pinhole 96A is provided between the adjacent filter units. The use of such a shielding plate functioning as a spatial filter allows a desired wavelength characteristic to be obtained without making the wedge directions different from each other as in FIG. 8 or making the wedge angles different from each other as in FIG. 11. Also in this preferred embodiment, the means for adjusting the magnitude of birefringence in the plane plate 12 in each filter unit is not shown in FIG. 13.

Figure 14:
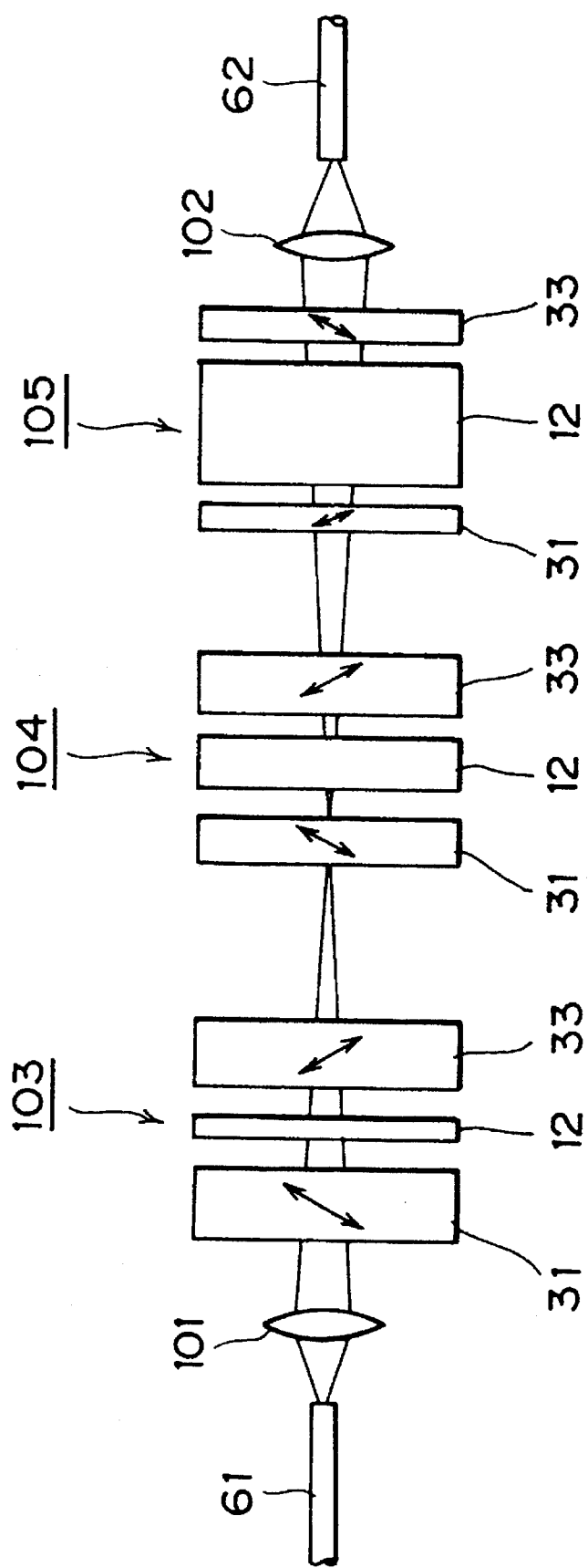
FIG. 14 is an illustration showing the configuration of an essential part of an optical filter according to a sixth preferred embodiment of the present invention.

FIG. 14 illustrates the configuration of an optical filter according to a sixth preferred embodiment of the present invention. In this preferred embodiment, lenses 101 and 102 for forming optical paths of a converging system are provided between an input optical fiber 61 and an output optical fiber 62, and filter units 103, 104, and 105 each having a configuration similar to that shown in FIG. 5 are provided between the lenses 101 and 102. To prevent that the undesired beams once deviated from the optical paths may be returned to the optical paths, the thicknesses of birefringent plane plates 31 in the filter units 103, 104, and 105 are made different from each other. Further, for the same purpose as that in the fourth preferred embodiment shown in FIG. 11, the sequence of the thicknesses of the second birefringent elements (plane plates 12) in the filter units 103, 104, and 105 forms a geometric progression. As an alternative means for preventing that the undesired beams once deviated from the optical paths may be returned to the optical paths, the space between the adjacent filter units may be made enough larger than the length of each filter unit.

Although the wavelength characteristic of the optical filter is made variable by adjusting the magnitude of birefringence in the second birefringent element according to the above preferred embodiments, the magnitude of birefringence in the second birefringent element may be preliminarily set so as to obtain a desired wavelength characteristic. In this case, the adjusting means for changing the magnitude of birefringence in the second birefringent element is unnecessary.

As described above, according to the first aspect of the present invention, it is possible to provide a polarization-nondependent optical filter which can obtain a desired wavelength characteristic. In the case where the adjusting means is omitted from the first aspect of the present invention, it is possible to provide a polarization-nondependent optical filter. According to a specific embodiment in accordance with the first aspect of the present invention, it is possible to provide a polarization-nondependent optical filter which can obtain a desired wavelength characteristic without using a mechanical movable portion. According to the second aspect of the present invention, it is possible to provide a polarization-nondependent optical filter which can obtain a desired arbitrary wavelength characteristic.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. An optical filter comprising:

a first birefringent element having a first principal axis, for splitting an input beam into a first beam having a plane of polarization perpendicular to said first principal axis and a second beam having a plane of polarization parallel to said first principal axis to output said first beam and said second beam;

a second birefringent element having a second principal axis inclined at an angle to said first principal axis, for receiving said first beam and said second beam, and outputting a third beam converted in polarized condition from said first beam and a fourth beam converted in polarized condition from said second beam;

a third birefringent element provided substantially symmetrically with said first birefringent element with respect to said second birefringent element and having a third principal axis, for receiving said third beam and said fourth beam, splitting said third beam into a fifth beam having a plane of polarization perpendicular to said third principal axis and a sixth beam having a plane of polarization parallel to said third principal axis to output said fifth beam and said sixth beam, and splitting said fourth beam into a seventh beam having a plane of polarization perpendicular to said third principal axis and an eighth beam having a plane of polarization parallel to said third principal axis to output said seventh beam and said eighth beam; and adjusting means for changing vector of birefringence in said second birefringent element;

said first, second, and third birefringent elements being arranged in this order on an optical path leading from an input port to an output port;

said optical path comprising a first optical path including said first, third, and fifth beams and a second optical path including said second, fourth, and eighth beams;

said sixth and seventh beams being deviated from said optical path to be removed.

2. An optical filter according to claim 1, wherein said first birefringent element comprises a first birefringent wedge plate having a wedge angle for outputting said first and second beams in mutually different directions;

said first principal axis is substantially perpendicular to said input beam;

said third birefringent element comprises a second birefringent wedge plate formed of the same material as that of said first birefringent wedge plate and having the same wedge angle as that of said first birefringent wedge plate; and said fifth and eighth beams are parallel to each other.

3. An optical filter according to claim 2, wherein said input port comprises an excitation end of an input optical fiber, and said output port comprises an excitation end of an output optical fiber;

said optical filter further comprises at least two lenses for making each of said first and second optical paths into a collimating system; and said fifth and eighth beams are coupled to said excitation end of said output optical fiber by one of said lenses nearest to said output optical fiber.

4. An optical filter according to claim 1, wherein said first birefringent element comprises a first birefringent plane plate having a uniform thickness for outputting said first and second beams from mutually different positions in mutually parallel directions;

said first principal axis is inclined at an angle of about 45° to said input beam;

said third birefringent element comprises a second birefringent plane plate formed of the same material as that of said first birefringent plane plate and having the same thickness as that of said first birefringent plane plate; and said fifth and eighth beams are superimposed on each other.

5. An optical filter according to claim 4, wherein said input port comprises an excitation end of an input optical fiber, and said output port comprises an excitation end of an output optical fiber;

said optical filter further comprises at least two lenses for making each of said first and second optical paths into a converging system; and said fifth and eighth beams are coupled to said excitation end of said output optical fiber by one of said lenses nearest to said output optical fiber.

6. An optical filter according to claim 1, wherein said second birefringent element comprises a first birefringent wedge plate having a top portion small in thickness and a bottom portion large in thickness, and a second birefringent wedge plate having a bottom portion and a top portion respectively located on the same sides of said top portion and said bottom portion of said first birefringent wedge plate with respect to said optical path; and said adjusting means comprises means for displacing at least one of said first and second birefringent wedge plates in a direction substantially perpendicular to said first and second optical paths.

7. An optical filter according to claim 1, wherein said second birefringent element is supported pivotably about a shaft substantially perpendicular to said first and second optical paths; and said adjusting means comprises means for changing a rotational angle of said second birefringent element about said shaft.

8. An optical filter according to claim 1, wherein said adjusting means comprises means for applying a stress to said second birefringent element and means for changing said stress.

9. An optical filter according to claim 1, wherein said adjusting means comprises means for changing a temperature of said second birefringent element.

10. An optical filter according to claim 1, wherein said adjusting means comprises means for applying a voltage to said second birefringent element and means for changing said voltage.

11. An optical filter according to claim 1, wherein said second birefringent element comprises a first birefringent plane plate fixed in position with respect to said first and second optical paths and a second birefringent plane plate supported pivotably about a shaft substantially parallel to said first and second optical paths; and said adjusting means comprises means for changing a rotational angle of said second birefringent plane plate about said shaft.

12. An optical filter comprising a plurality of filter units cascade-connected together;

each of said filter units comprising:
a first birefringent element having a first principal axis, for splitting an input beam into a first beam having a plane of polarization perpendicular to said first principal axis and a second beam having a plane of polarization parallel to said first principal axis to output said first beam and said second beam;
a second birefringent element having a second principal axis inclined at an angle to said first principal axis, for receiving said first beam and said second beam, and outputting a third beam converted in polarized condition from said first beam and a fourth beam converted in polarized condition from said second beam;
a third birefringent element provided substantially symmetrically with said first birefringent element with respect to said second birefringent element and having a third principal axis, for receiving said third beam and said fourth beam, splitting said third beam into a fifth beam having a plane of polarization perpendicular to said third principal axis and a sixth beam having a plane of polarization parallel to said third principal axis to output said fifth beam and said sixth beam, and splitting said fourth beam into a seventh beam having a plane of polarization perpendicular to said third principal axis and an eighth beam having a plane of polarization parallel to said third principal axis to output said seventh beam and said eighth beam; and
adjusting means for changing a vector of birefringence in said second birefringent element;
said first, second, and third birefringent elements being arranged in this order on an optical path leading from an input port to an output port;
said optical path comprising a first optical path including said first, third, and fifth beams and a second optical path including said second, fourth, and eighth beams;
said sixth and seventh beams being deviated from said optical path to be removed.

13. An optical filter according to claim 12, wherein said second birefringent elements of said filter units have mutually different thicknesses, the sequence of said different thicknesses from the smallest ones forming a geometric progression with a ratio of 2.

14. An optical filter according to claim 12, wherein said first birefringent element in each filter unit comprises a first birefringent wedge plate having a wedge angle for outputting said first and second beams in mutually different directions;

said first principal axis in each filter unit is substantially perpendicular to said input beam;

said third birefringent element in each filter unit comprises a second birefringent wedge plate formed of the same material as that of said first birefringent wedge plate and having the same wedge angle as that of said first birefringent wedge plate; and said fifth and eighth beams in each filter unit are parallel to each other.

15. An optical filter according to claim 14, wherein said first birefringent wedge plates of said filter units have mutually different wedge directions.

16. An optical filter according to claim 14, wherein said wedge angles of said first birefringent wedge plates of said filter units are different from each other.

17. An optical filter according to claim 14, wherein each filter unit further comprises at least two lenses for making each of said first and second optical paths into a collimating system; and said optical filter further comprises at least one shielding plate having a pinhole for removing said sixth and seventh beams between adjacent ones of said filter units.

18. An optical filter according to claim 12, wherein said first birefringent element in each filter unit comprises a first birefringent plane plate having a uniform thickness for outputting said first and second beams from mutually different positions in mutually parallel directions;

said first principal axis in each filter unit is inclined at an angle of about 45° to said input beam;

said third birefringent element in each filter unit comprises a second birefringent plane plate formed of the same material as that of said first birefringent plane plate and having the same thickness as that of said first birefringent plane plate; and said fifth and eighth beams in each filter unit are superimposed on each other.

19. An optical filter comprising:

a first birefringent element having a first principal axis, for splitting an input beam into a first beam having a plane of polarization perpendicular to said first principal axis and a second beam having a plane of polarization parallel to said first principal axis to output said first beam and said second beam;

a second birefringent element having a second principal axis inclined at an angle to said first principal axis, for receiving said first beam and said second beam, and outputting a third beam converted in polarized condition from said first beam and a fourth beam converted in polarized condition from said second beam; and a third birefringent element provided substantially symmetrically with said first birefringent element with respect to said second birefringent element and having a third principal axis, for receiving said third beam and said fourth beam, splitting said third beam into a fifth beam having a plane of polarization perpendicular to said third principal axis and a sixth beam having a plane of polarization parallel to said third principal axis to output said fifth beam and said sixth beam, and splitting said fourth beam into a seventh beam having a plane of polarization perpendicular to said third principal axis and an eighth beam having a plane of polarization parallel to said third principal axis to output said seventh beam and said eighth beam;

said first, second, and third birefringent elements being arranged in this order on an optical path leading from an input port to an output port;

said optical path comprising a first optical path including said first, third, and fifth beams and a second optical path including said second, fourth, and eighth beams;

said sixth and seventh beams being deviated from said optical path to be removed.

* * * * *